US010242320B1

(12) United States Patent
Elkholy et al.

(10) Patent No.: US 10,242,320 B1
(45) Date of Patent: Mar. 26, 2019

(54) MACHINE ASSISTED LEARNING OF ENTITIES

(71) Applicant: Maana, Inc., Palo Alto, CA (US)

(72) Inventors: Alexander Hussam Elkholy, Seattle, WA (US); Balasubramanian Kandaswamy, Redmond, WA (US); Steven Matt Gustafson, Sammamish, WA (US); Hussein S. Al-Olimat, Dayton, OH (US)

(73) Assignee: Maana, Inc., Palo Alto, CA (US)

( * ) Notice: Subject to any disclaimer, the term of this patent is extended or adjusted under 35 U.S.C. 154(b) by 0 days.

(21) Appl. No.: 15/957,838

(22) Filed: Apr. 19, 2018

(51) Int. Cl.
| | |
|---|---|
| *G06N 20/20* | (2019.01) |
| *G06N 20/00* | (2019.01) |
| *G06N 99/00* | (2019.01) |
| *G06F 17/27* | (2006.01) |
| *G06F 17/30* | (2006.01) |
| *G06F 16/93* | (2019.01) |

(52) U.S. Cl.
CPC ............. *G06N 20/00* (2019.01); *G06F 16/93* (2019.01); *G06F 17/274* (2013.01); *G06F 17/278* (2013.01); *G06F 17/30011* (2013.01); *G06N 99/005* (2013.01)

(58) Field of Classification Search
CPC ........... G06F 17/2775; G06F 17/30616; G06F 17/30731; G06N 7/005; G06N 99/005
See application file for complete search history.

(56) References Cited

U.S. PATENT DOCUMENTS

| | | | | |
|---|---|---|---|---|
| 9,218,427 | B1* | 12/2015 | Thompson, III | .... G06F 17/3087 |
| 9,501,578 | B2* | 11/2016 | Thompson, III | .... G06F 17/3087 |
| 9,576,031 | B1 | 2/2017 | Aggarwal et al. | |
| 9,645,999 | B1* | 5/2017 | Ciulla | ................. G06F 17/2785 |
| 2008/0250064 | A1 | 10/2008 | Duchon et al. | |
| 2012/0284213 | A1* | 11/2012 | Lin | ...................... G06N 99/005 706/12 |
| 2015/0379414 | A1 | 12/2015 | Yeh et al. | |
| 2016/0098645 | A1* | 4/2016 | Sharma | .................. G06N 7/005 706/12 |
| 2016/0117604 | A1* | 4/2016 | Frosst | .................. G06N 99/005 706/12 |

(Continued)

OTHER PUBLICATIONS

Office Communication for U.S. Appl. No. 15/714,866 dated Jan. 8, 2018, 12 pages.

(Continued)

*Primary Examiner* — Paulinho E Smith
(74) *Attorney, Agent, or Firm* — John W. Branch; Lowe Graham Jones PLLC

(57) ABSTRACT

A data model is traversed to determine concept characteristics associated with concepts that may be associated with entities. Associated documents may be evaluated to identify document characteristics associated with the entities. Entity models may be trained based on the concept characteristics and the document characteristics with each entity model being associated with a confidence value. Results for one or more queries based on the documents and the entity models may be provided. The results may reference the documents that may be associated with the entities. Some entity models may produce results that have a confidence value below a threshold value. Accordingly, the entity models that provide low confidence results may be re-trained.

28 Claims, 9 Drawing Sheets

(56) References Cited

U.S. PATENT DOCUMENTS

| | | | |
|---|---|---|---|
| 2016/0246789 A1 | 8/2016 | Wu et al. | |
| 2016/0267166 A1* | 9/2016 | Kohlmeier | G06F 17/30312 |
| 2017/0228239 A1* | 8/2017 | Elassaad | G06F 9/451 |
| 2017/0329817 A1* | 11/2017 | Stoica-Beck | G06F 17/27 |
| 2017/0359236 A1* | 12/2017 | Circlaeys | G06F 17/3002 |
| 2018/0114275 A1 | 4/2018 | Wang et al. | |

OTHER PUBLICATIONS

Office Communication for U.S. Appl. No. 15/934,825 dated May 31, 2018, 56 pages.

\* cited by examiner

MACHINE ASSISTED LEARNING OF ENTITIES

TECHNICAL FIELD

This invention relates generally to information organization and data modeling and more particularly, to identifying entities in text.

BACKGROUND

Organizations are generating and collecting an ever-increasing amount of data, much of it in the form of text. Often text is generated during the course of business, such as a doctor's notes, an engineer's equipment inspection report, product manuals, etc., only to be siloed away. Increasingly, organizations are interested in understanding the content of this text and extracting useful information from it. However, searching through large volumes of text is cumbersome, expensive, and error prone.

One technique, named entity recognition (NER), seeks to locate and classify entities into pre-defined categories such as the names of persons, organizations, locations, expressions of time, quantities, monetary values, percentages, etc. NER is typically domain specific—implementations directed to one domain, e.g. news, do not generalize to others, e.g. Twitter®. For example, different NER models may be used to identify part numbers in product manuals, baseball players in a collection of sports articles, airplane models in a collection of aircraft worthiness documents, etc.

Existing techniques for NER include training a machine learning model and hand-crafted rules. Hand-crafting rules can be a laborious process, while training a machine learning model often requires large amounts of hand labeling. Neither technique generalizes well. Active learning decreases the amount of hand labeling by iteratively asking a user to label examples, classifying data based on those labels, and identifying more examples based on the classification. However, selecting examples so as to gain the greatest insight with the fewest number of labeling actions is an ongoing technological problem. It is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
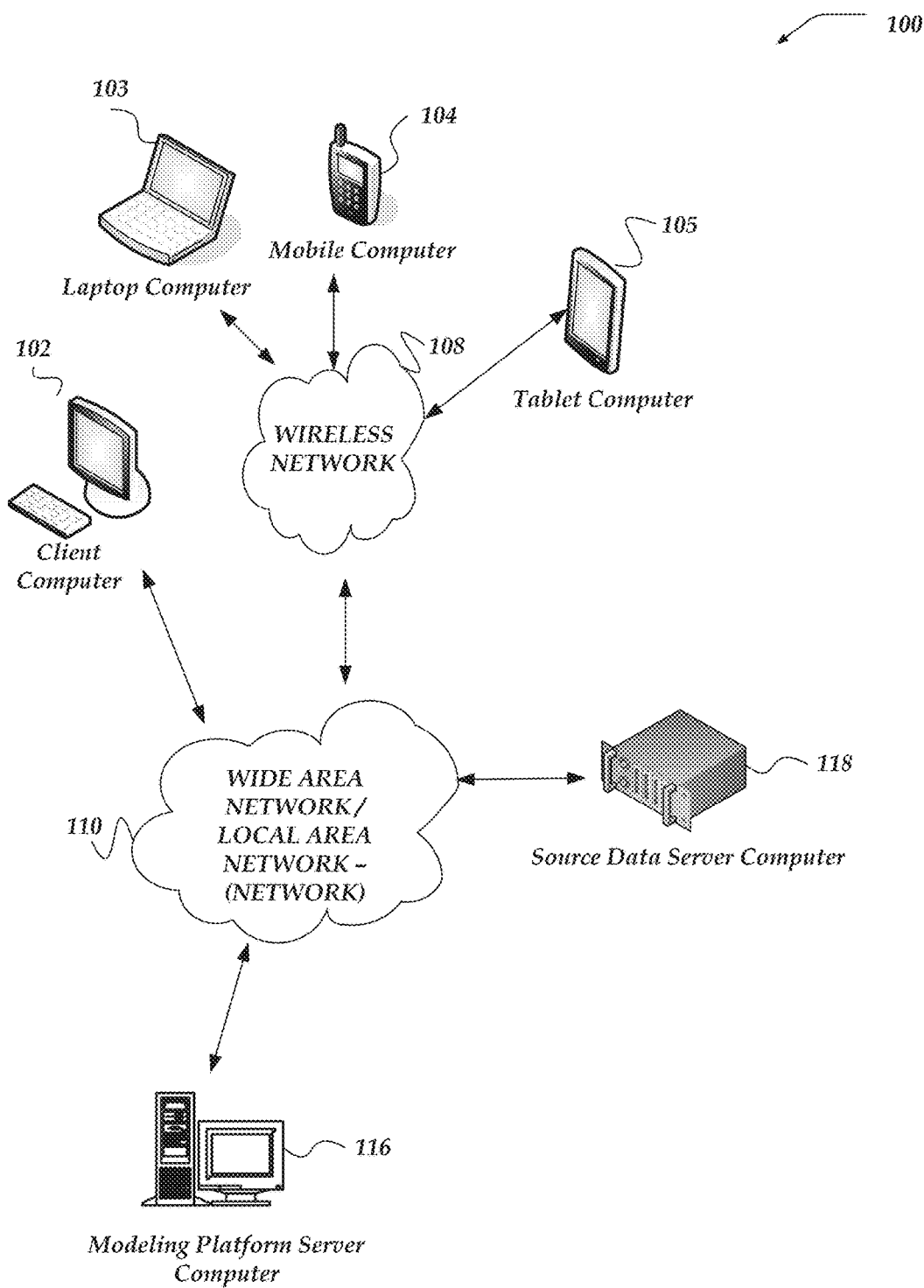
FIG. 1 illustrates components of one embodiment of an environment in which embodiments of the invention may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. Also, throughout the specification and the claims, the use of "when" and "responsive to" do not imply that associated resultant actions are required to occur immediately or within a particular time period. Instead they are used herein to indicate actions that may occur or be performed in response to one or more conditions being met, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, Python, JavaScript, Ruby, VBScript, Microsoft .NET™ languages such as C#, and/or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "feature" refers to an attribute of a sentence that may be used as input to an entity recognition machine learning process. Example features include part of speech tags, e.g. "noun phrase", "adjective", "verb", etc., word embeddings, or other results of natural language processing techniques.

As used herein, the term "domain" refers to a field or subject. For example, a concept model may include concepts and relations from a human resources domain, including employees, contractors, building resources, or the like.

As used herein, the terms "named entity," or "entity" refer to a noun objects, such as persons, locations, organizations, products, or the like, that may be identified in a text corpus or documents. An entity may also refer to temporal and numerical expressions such as amounts of money, part numbers, or the like.

As used herein the terms "data model," or "concept model" refer to a data structure that include objects that may be nodes that represent concepts and the edges represent relationships between the concepts. A data model may be based on or represent one or more ontologies. The ontologies that define the model may be pre-defined, custom, and/or portions of existing ontologies, or combinations thereof. Ontologies are often created by subject matter experts. A data model represents the structural organization and/or relationship of concepts. Each concept node of a data model may be mapped to one or more instances of that concept. Each instance of a concept may be mapped to a data source, e.g. a field in a data object, a portion of a document, a row of a database table, etc., from which the concept instance was derived.

As used herein, the term "data object" refers to an object that models various characteristics of a raw objects or concepts. Data objects may include one or more data object fields that include one or more attributes (e.g., data field attributes) that represent features or characteristics of their corresponding data object fields.

As used herein, the term "concept characteristics" refers to various characteristics associated with a concept or entity that are derived from a concept model or data model. These may include relation information, nearness to other concepts in the data model, parent node information, child node information, or the like. In some cases, they may include meta-data or data-type information that is associated with a concept or concept node. For example, a concept that represents a date may be tagged with data-type information that indicates the concept represents a date.

As used herein, the term "document characteristics" refers to various characteristics associated with an entity that are derived from the text that includes or represents the entity. These may include string characters, spelling, parts-of-speech, nearness to keywords or other entities, or the like.

As used herein the terms "query," and "query string" refer to commands or sequences of commands that are used for querying, searching or retrieving data from a modeling system. Queries generally produce a result or results depending on the form and structure of the particular query string. Query results may be sorted and grouped based on the structure and form of the query string. In at least one of the various embodiments, query strings may include operators and functions for calculating values based on the stored records, including functions that produce result sets that may include statistics and metrics about the data stored in data repository. Structured Query Language (SQL) is a well-known query language often used to form queries for relational databases. However, the various embodiments are not limited to using SQL-like formatting for query strings. Accordingly, other well-known query languages or custom query languages may be employed.

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing data. In one or more of the various embodiments, a data engine may be instantiated to perform actions to provide a data model that includes one or more concepts and one or more relations between the concepts such that each concept is a node in the data model and each relation is an edge in the data model.

In one or more of the various embodiments, the data engine may provide one or more documents that include one or more entities such that the one or more entities may be associated with the one or more concepts.

In one or more of the various embodiments, a training engine may be instantiated to traverse the data model to determine one or more concept characteristics that may be associated with the one or more concepts that may be associated with the one or more entities. In some embodiments, determining the one or more concept characteristics may include determining additional related entities, confirmed entities, disconfirmed entities, semantic features, characteristics associated with other related concepts, or the like.

In one or more of the various embodiments, the training engine may evaluate the one or more documents to identify one or more document characteristics associated with the one or more entities. In one or more of the various embodiments, evaluating the one or more documents may include dividing the one or more documents into words, parts-of-speech, sentences, paragraphs, pages, sections, chapters, versions, volumes, or the like.

In one or more of the various embodiments, the training engine may train one or more entity models based on the one or more concept characteristics and the one or more document characteristics such that each entity model may be associated with a confidence value.

In one or more of the various embodiments, training the one or more entity models may include determining the one or more concept characteristics, or the one or more document characteristics based on input from one or more users.

In one or more of the various embodiments, training the one or more entity models may include: traversing one or more other data models that may be related to the one or more documents; linking the one or more entities to the one or more other data models; and linking the one or more entities to the data model.

In one or more of the various embodiments, training the one or more entity models may include modifying the data model based on the training of the one or more entity models such that the modifications may include adding concepts, removing concepts, adding relations, removing relations, or the like.

In one or more of the various embodiments, a query engine may be instantiated to resolve results for one or more queries based on the one or more documents and the one or more entity models such that the results reference the one or more documents that may be associated with the one or more entities. In one or more of the various embodiments, providing the results may include determining the one or more entities that are associated with the results and associating the one or more determined entities with the one or more documents such that the one or more associated documents are one or more source documents that are associated with the one or more determined entities.

In one or more of the various embodiments, the query engine may determine one or more entity models that may be associated with a confidence value that may be below a threshold value for the results. In one or more of the various embodiments, the query engine may provide the one or more determined entity models to the training engine for re-training.

Illustrated Operating Environment

FIG. 1 illustrates components of one embodiment of an environment in which embodiments of the invention may be practiced. Not all the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, modeling platform server computer 116, one or more source data server computers 118, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), universally unique identifiers (UUIDs), or other device identifiers. Such information may be provided in a network packet, or the like, sent between other client computers, modeling platform server computer 116, one or more source data server computers 118, or other computers.

Client computers 102-105 may further be configured to include a client application that enables an end-user to log into an end-user account that may be managed by another computer, such as modeling platform server computer 116, one or more source data server computers 118, or the like. Such an end-user account, in one non-limiting example, may be configured to enable the end-user to manage one or more online activities, including in one non-limiting example, project management, software development, system administration, data modeling, search activities, social networking activities, browse various websites, communicate with other users, or the like. Also, client computers may be arranged to enable users to display reports, interactive user-interfaces, and/or results provided by modeling platform server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, modeling platform server computer 116, one or more source data server computers 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of modeling platform server computer 116 is described in more detail below in conjunction with FIG. 3. Briefly, however, modeling platform server computer 116 includes virtually any network computer that is specialized to provide data modeling services as described herein.

Although FIG. 1 illustrates modeling platform server computer 116 as a single computer, the innovations and/or embodiments are not so limited. For example, one or more functions of modeling platform server computer 116, or the like, may be distributed across one or more distinct network computers. Moreover, modeling platform server computer 116 is not limited to a particular configuration such as the one shown in FIG. 1. Thus, in one embodiment, modeling platform server computer 116 may be implemented using a plurality of network computers. In other embodiments, server computers may be implemented using a plurality of network computers in a cluster architecture, a peer-to-peer architecture, or the like. Further, in at least one of the various embodiments, modeling platform server computer 116 may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
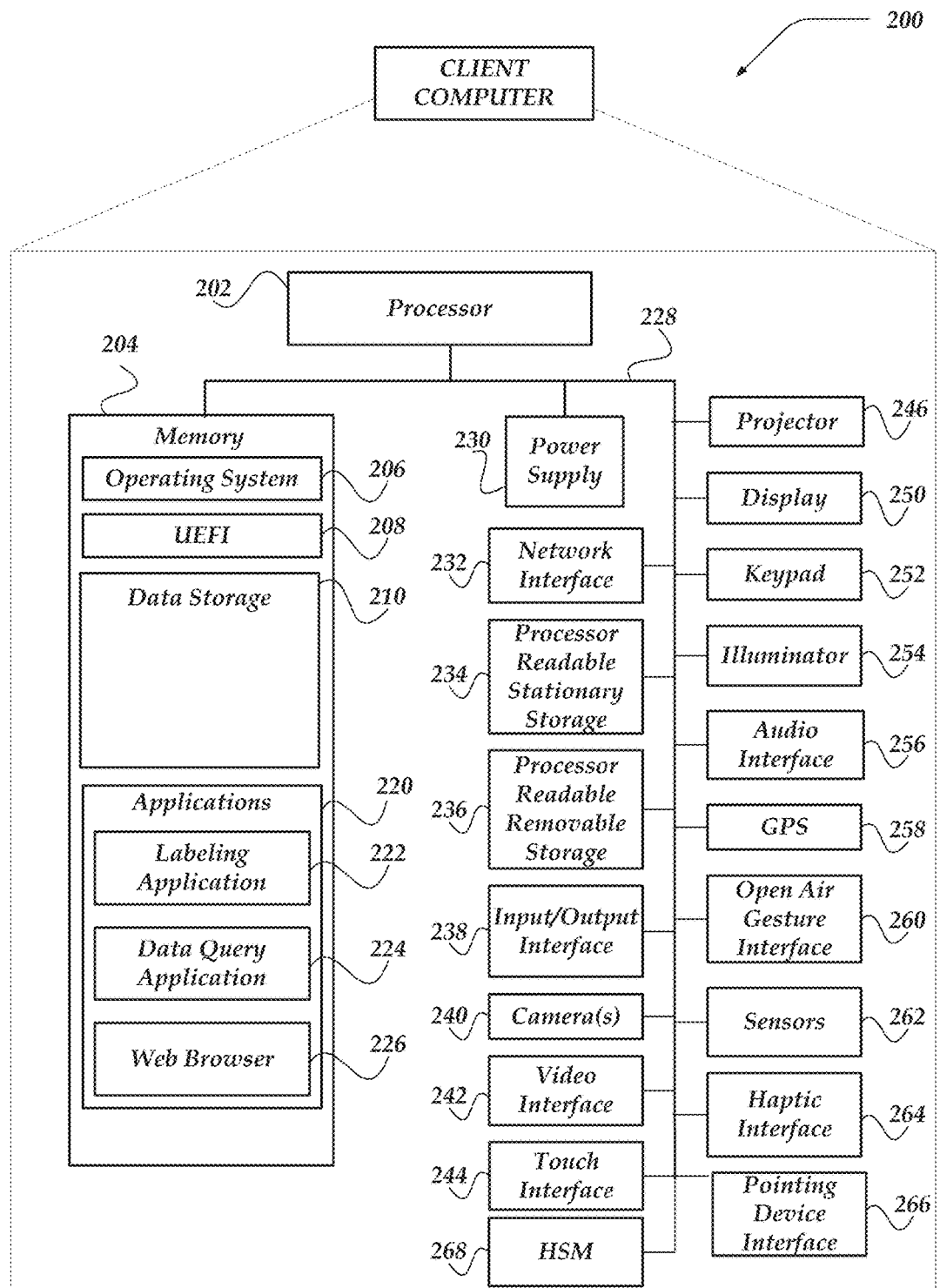
FIG. 2 illustrates one embodiment of client computer.

FIG. 2 illustrates one embodiment of client computer 200 that may include many more or less components than those shown. Client computer 200 may represent, for example, at least one embodiment of mobile computers or client computers shown in FIG. 1.

Client computer 200 may include one or more processors, such as processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope, accelerometer, or the like may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, electronic paper, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, Bluetooth Low Energy. or the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

In at least one of the various embodiments, applications, such as, labeling application, data query application 224 web browser 226, or the like, may be arranged to employ geo-location information to select one or more localization features, such as, time zones, languages, currencies, calendar formatting, or the like. Localization features may be used in user-interfaces, reports, as well as internal processes and/or databases. In at least one of the various embodiments, geo-location information used for selecting localization information may be provided by GPS 258. Also, in some embodiments, geolocation information may include information provided using one or more geolocation protocols over the networks, such as, wireless network 108 and/or network 111.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™, Bluetooth Low Energy, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store Unified Extensible Firmware Interface (UEFI) 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™. The operating system may include, or interface with a Java and/or JavaScript virtual machine modules that enable control of hardware components and/or operating system operations via Java application programs or JavaScript programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, user credentials, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, labeling application 222. In at least one of the various embodiments, labeling application 222 may provide a sentence to a user or other source of truth for labeling. Labeling may include identifying an entity within the sentence. Labeling application 222 may be used to interact with a modeling platform, e.g. modeling platform server computer 116, to develop named entity recognizers (NERs) based on the received labels.

Applications 220 may also include data query application 224. In one or more of the various embodiments, data query application 224 performs queries that utilize NERs or that are based on data extracted by NERs. For example, a collection of documents may be processed with NERs to recognize entities. These entities may be used to populate a data model, which may then be linked to existing structured or unstructured data, including other data models. Then, in one or more of the various embodiments, data query application 224 may perform queries against the populated data model as linked to existing structured or unstructured data. In this way, entities extracted from text documents can be leveraged to provide useful insights beyond the context in which they were found.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of one or more CPUs, such as, an Application Specific Integrated Circuits (ASICs), Field Programmable Gate Arrays (FPGAs), Programmable Array Logic (PAL), or the like, or combination thereof. The embedded logic hardware devices may directly execute embedded logic to perform actions. Also, in one or more embodiments (not shown in the figures), the client computer may include one or more hardware microcontrollers instead of one or more CPUs. In at least one embodiment, the microcontrollers be system-on-a-chips (SOCs) that may directly execute their own embedded logic to perform actions and access their own internal memory and their own external Input and Output Interfaces (e.g., hardware pins and/or wireless transceivers) to perform actions.

Illustrative Network Computer

Figure 3:
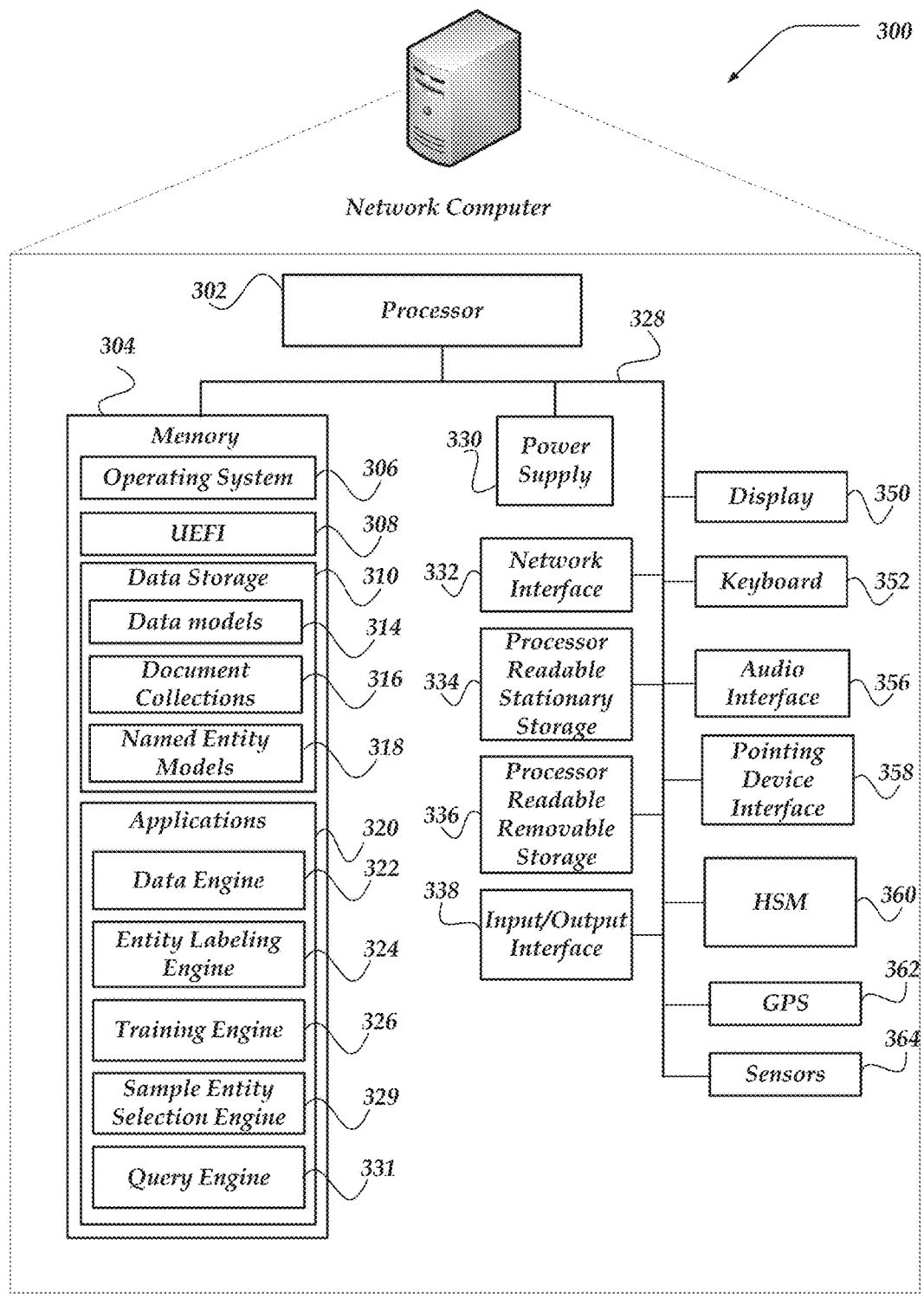
FIG. 3 illustrates one embodiment of network computer that may be included in a system implementing one or more embodiments of the described innovations.

FIG. 3 illustrates one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of modeling platform server computer 116 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300. In some embodiments, processor 302 may be a multiprocessor system that includes one or more processors each having one or more processing/execution cores.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, data engine 322, entity labeling engine 324, training engine 326, sample entity selection engine 329, or query engine 331 or the like, may be arranged to employ geo-location information to select one or more localization features, such as, time zones, languages, currencies, calendar formatting, or the like. Localization features may be used in data model meta-data, data model objects, machine learning, user-interfaces, reports, as well as internal processes and/or databases. In at least one of the various embodiments, geo-location information used for selecting localization information may be provided by GPS 362. Also, in some embodiments, geolocation information may include information provided using one or more geolocation protocols over the networks, such as, wireless network 108 or network 110. In particular, geolocation information may be used to improve the training and configuration associated with generating entity models. For example, localization information may be applied to interpret the semantic meaning of one or more portions of text in a data set. For example, machine learning may identify features that are relevant only in particular geographic locations. Or, in some cases, data may have different meaning in different locations because of differences related to language, culture, climate, religion, local legal frameworks, local holidays, or the like, or combination thereof. Accordingly, operating system 306, data engine 322, entity labeling engine 324, training engine 326, sample entity selection engine 329, or query engine 331 or the like, may receive information provided by GPS 362, or the like, to adapt to the local geography.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of non-transitory computer readable and/or writeable media. Memory 304 illustrates an example of computer-readable storage media (devices) for storage of information such as computer-readable instructions, data structures, program modules or other data. Memory 304 stores a unified extensible firmware interface (UEFI) 308 for controlling low-level operation of network computer 300. The memory also stores an operating system 306 for controlling the operation of network computer 300. It will be appreciated that this component may include a general-purpose operating system such as a version of UNIX, or Linux®, or a specialized operating system such as Microsoft Corporation's Windows® operating system, or the Apple Corporation's OSX® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by one or more processors, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, document collections 316, entity models 318, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include data engine 322, entity labeling engine 324, training engine 326, sample entity selection engine 329, query engine 331, or the like, that may perform actions further described below. In at least one of the various embodiments, one or more of the applications may be implemented as modules and/or components of another application. Further, in at least one of the various embodiments, applications may be implemented as operating system extensions, dynamic libraries, modules, plugins, Application Specific Integrated Circuits (ASICs), Field Programmable Gate Arrays (FPGAs), Programmable Array Logic (PALs), or the like, or combination thereof.

Furthermore, in at least one of the various embodiments, data engine 322, entity labeling engine 324, training engine 326, sample entity selection engine 329, or query engine 331 may be operative in a cloud-based computing environment. In at least one of the various embodiments, these engines, and others, that comprise the modeling platform that may be executing within virtual machines and/or virtual servers that may be managed in a cloud-based based computing environment. In at least one of the various embodiments, in this context applications including the engines may flow from one physical network computer within the cloud-based environment to another depending on performance and scaling considerations automatically managed by the cloud computing environment. Likewise, in at least one of the various embodiments, virtual machines and/or virtual servers dedicated to data engine 322, entity labeling engine 324, training engine 326, sample entity selection engine 329, or query engine 331 may be provisioned and de-commissioned automatically.

Further, in some embodiments, network computer 300 may also include hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an one or more embedded logic hardware devices instead of one or more CPUs, such as, Application Specific Integrated Circuits (ASICs), Field Programmable Gate Arrays (FPGAs), Programmable Array Logic (PALs), or the like, or combination thereof. The one or more embedded logic hardware devices may directly execute its embedded logic to perform actions. Also, in one or more embodiments (not shown in the figures), the network computer may include one or more hardware microcontrollers instead of one or more CPUs. In at least one embodiment, the one or more microcontrollers may directly execute embedded logic to perform actions and access their own internal memory and their own external Input and Output Interfaces (e.g., hardware pins and/or wireless transceivers) to perform actions. E.g., they may be arranged as Systems On Chips (SOCs).

Illustrative Logical System Architecture

Figure 4:
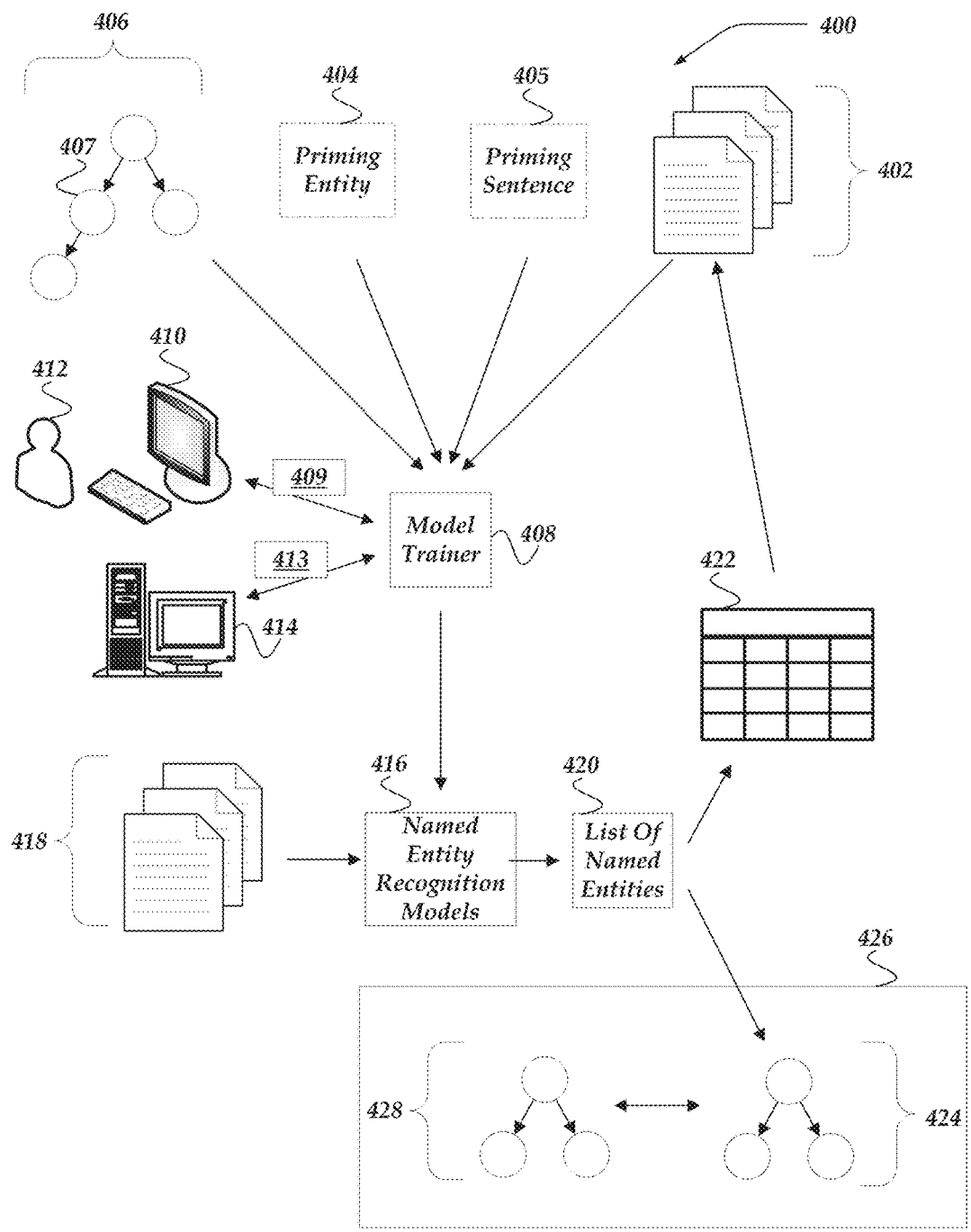
FIG. 4 illustrates a logical architecture in accordance with one or more of the various embodiments.

FIG. 4 illustrates a logical architecture 400 for machine assisted learning of entities in accordance with one or more of the various embodiments. In one or more of the various embodiments, one or more entity models may be generated to identify entities within a collection of documents (i.e. entity model, named entity model or NER model). For example, NER models may be generated to identify names of baseball players within a collection of sports pages, defects identified by field engineers in a collection of inspection reports, incidents reported in a collection of factory incident reports, etc. Document collections may include historical documents, e.g. product manuals, or may include language created on the job, e.g. doctor notes. Document collections may be very large, consisting of thousands, hundreds of thousands, millions of documents, or more. In one or more of the various embodiments, documents in a document collection share a domain in that they are related by topic, author, content, or the like. Some entity models trained against one domain may not be effective when applied to another domain. As the number of domains may be large and growing, there is even greater demand for technologies that speed training and improve accuracy of a NER model.

The entity model may be generated using an assisted learning process in conjunction with a concept model. In one or more of the various embodiments, the concept model may be used to select a first set of sentences to be labeled by a user. The concept model may also be used to select subsequent sentences and label them to be presented to a user for confirmation or disconfirmation of the label. In one or more of the various embodiments, the assisted learning process is primed with user supplied examples. Leveraging a concept model and/or priming enables a model to be trained with fewer labeling operations while increasing quality and accuracy by providing a user with more relevant examples to label.

In one or more of the various embodiments, an organization may wish to understand a collection of documents 402 by training one or more entity models, such as entity model 416. NER 416 may be used to extract a list of particular entities 420 from one or more text documents 418. These entities 420 may be linked to other structured or unstructured data, e.g. table 422 or concept model 426. Queries may be performed across these linked data stores to gain insight into the identified entities and the documents they are associated with.

A user may begin generating NER 416 by supplying the collection of documents 402 and concept model 406 to model trainer 408. Optionally, the user may identify a priming concept 407, or one or more instances of priming concept 407, in concept model 406. Priming concept 407 may be used to identify more relevant sentences to be provided to the user for labeling. Additionally or alternatively, the assisted learning process may be primed with priming entity 404 and/or priming sentence 405.

In one or more of the various embodiments, model trainer 408 pre-processes document collection 402 by dividing the documents into sections of content, e.g. sentences, and initiates an assisted learning process. In one or more of the various embodiments, pre-processing may be performed by data engine 322.

The assisted learning process, described below in greater detail in conjunction with FIG. 5, selects an initial set of sentences 409 and provides them to a computing device 410 operated by a user 412 for labeling. In one or more of the various embodiments, the initial set of sentences 409 is selected by data query engine 331, while presenting sentences to a user for labeling is performed by entity labeling engine 324.

In one or more of the various embodiments, the initial set of sentences 409 is selected based in part on the concept model 406. However, additionally or alternatively, the initial set of sentences 409 may also be determined based on one or more priming entities, priming sentences, or priming concepts. For example, when creating a model for extracting part numbers from product catalogs, user 412 may be asked to label a sentence such as "control arm 42b, part#4523.200". In response, user 412, who may be a subject matter expert, may label "4523.300" as a part number. Once the initial set of sentences 409 has been labeled, model trainer 408 will generate an initial version of NER 416. In one or more of the various embodiments, the results of user labeling may be processed by training engine 326 to generate the initial version of NER 416.

In one or more of the various embodiments, sample entity selection engine 329 uses NER 416 to find additional relevant sentences. NER 416 may also be used to label the relevant sentences, i.e. providing suggested labels for evaluation by a user. Then, entity labeling engine 324 may provide the labeled relevant sentences to user 412 to be confirmed, disconfirmed, and/or additionally labeled.

Additionally or alternatively, entity labeling engine 324 may provide sentences 413 to a database 414 to for labeling. For example, database 414 may include a parts database. In one or more of the various embodiments, a query that determines whether a part number exists in a sentence may be generated and sent to database 414. The query may label the part number, if one exists. In another embodiment, a result of the query may be analyzed by entity labeling engine 324 to determine if an entity was found in sentence 413.

Once entity model 416 has been trained it may be used by query engine 331 to extract a list of entities 420 from one or more documents 418. Typically, entity recognizers are trained with data from a given domain, and are most effective when applied to data from the same domain. Thus, in one or more of the various embodiments, documents 418 are from the same domain (e.g. baseball, General Electric® part numbers, etc.) as document collection 402, and in some embodiments, documents 418 include the document collection 402. However, documents from related domains may also be processed. For example, an entity model trained based on a baseball domain may be used to extract player names from documents in a softball domain, with varying degrees of accuracy.

In one or more of the various embodiments, query engine 331 links the list of entities 420 to a data table 422 that references one or more sentences within document collection 402. The referenced sentences may include sentences that were labeled as part of the training process. In this way, a user may confirm the source material used by model trainer 408 to identify an entity. In one or more of the various embodiments, users may be enabled to retroactively update the model by confirming or disconfirming the accuracy of a labeling operation.

In one or more of the various embodiments, query engine 331 may use the list of entities 420 to train a concept model 424. Additionally or alternatively, the list of entities 420 may be added to the concept model 406. In one or more of the various embodiments, the concept model 424 may be linked to other concept models, e.g. concept model 428. These linked concept models enable a user to issue a query across both concept models 424 and 428 that refers to the list of entities 420. For example, in the domain of baseball, entity model 416 may be trained to identify baseball player names. Entity model 416 may be used to extract a list of baseball player names 420 from a collection of sports pages, and used to populate concept model 424. Another concept model 428 may be generated based on a collection of baseball cards, which list a player's historical statistics, which teams they played on, etc. By linking the two concept models, a query such as "which baseball player mentioned in the news today used to play for the Chicago Cubs from 2002-2005?" can be answered by a query to linked concept model 426.

Figure 5:
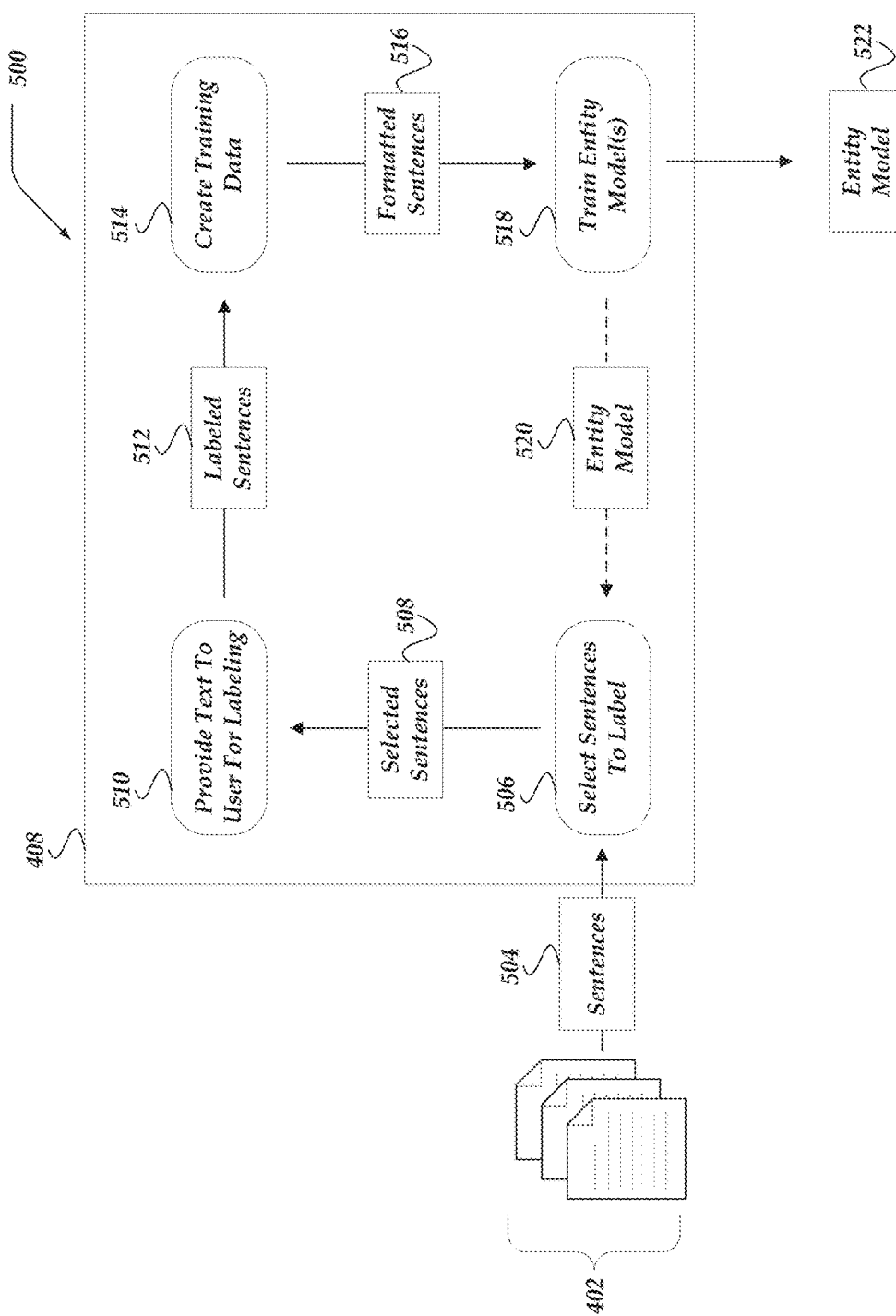
FIG. 5 illustrates a logical architecture depicting a model trainer.

FIG. 5 shows a logical architecture 500 depicting model trainer 408 in more detail. In one or more of the various embodiments, model trainer 408 performs assisted learning to label sentences, create training data, train entity models, and use the trained entity models to select additional sentences to be labeled.

In one or more of the various embodiments, document collection 402 is pre-processed to create sentences 504. While embodiments are described herein as dividing documents into sentences, pre-processing may similarly divide documents in other ways, e.g. into paragraphs, pages, etc. Similarly, where sentences are referenced in this document, it is understood that other types of text divisions are similarly contemplated. Pre-processing may also include applying a part of speech tagger to identify parts of speech (e.g. nouns, verbs, prepositional phrases, paragraphs, sections, pages, or the like.) to the sentences 504. The sentences 504 may also be processed to identify text that may be associated with concepts or instances of concepts found in concept model 406.

In one or more of the various embodiments, the select sentences to label action 506 ranks sentences 504, selecting a defined number of sentences 508 to be provided to the user 412 for labeling. The defined number may be user supplied, retrieved from a configuration file, or comprise a default value. For example, selected sentences 508 may comprise a top 5 or a top 50 sentences to be provided to the user for labeling.

In one or more of the various embodiments, the select sentences to label action 506 may select an initial set of sentences to be labeled by the user. For example, an initial set of sentences may be selected based on concepts identified in the sentences that are also found in the concept model 406. Additionally or alternatively, the initial set of sentences may be selected based in part on priming concept 407, priming entity 404, or priming sentence 405. In one embodiment, when the initial set of sentences is provided to a user for labeling, the sentences are unlabeled, such that the user labels an entity within the sentence. This is in contrast to subsequent provided sentences, which may be labeled by model trainer 408 for confirmation, disconfirmation, and/or additional labeling by the user.

Priming may increase the relevance of the first set of sentences provided to a user for labeling, and thereby reduce the number of sentences labeled to initially train entity model 520. This is in contrast with existing techniques that select sentences at random, often in number of 50 or more, for an initial round of labeling. Often these randomly selected sentences will be off-point, such that the user may find only a handful worth labeling.

In one or more of the various embodiment, priming entities 404, e.g. "Andre Dawson", "Don Mattingly", etc. may be used to select sentences to label. For example, a text search may be applied to the sentences 504 to identify sentences including one or more of the priming entities 404. A sentence may be prioritized based on a number of times an entity is included in the sentence, a number of different entities included sentence, or the like.

In one or more of the various embodiments, one or more instances of one or more priming concepts 407 may be selected by a user to prime the assisted learning process. In one or more of the various embodiments, sentences may be searched for instances of the priming concept 407. For example, if <player> was selected as a priming concept, and "Andre Dawson" was an instance of <player>, then sentences including "Andre Dawson" may be prioritized for labeling. Additionally or alternatively, a provided priming instance of a concept may be used to prioritize sentences. For example, if the <player> concept of concept model 406 is associated with instances "Andre Dawson" and "Don Mattingly", but the user selects "Andre Dawson" as a priming instance of a concept, sentences containing "Don Mattingly" would be omitted from the initial set of sentences to be labeled.

Additionally or alternatively, related concepts (e.g. concepts adjacent to priming concept 407) may be identified and used to prioritize the first set of sentences. For example, if <position> is adjacent to <player> in the concept model, instances of the <position> concept may be used to further refine the selection of sentences. For example, if "Andre Dawson" is associated with the "right field" instance of the <position> concept, sentences with "right field" may be prioritized.

In one or more of the various embodiments, priming sentence 405 may be used to select an initial set of sentences to be labeled. The priming sentence 405 may be enhanced with part of speech tagging, which identifies nouns, verbs, phrases, and other grammatical structures within a sentence. These features may be matched to features of sentences 504 to select sentences for labeling. Additionally or alternatively, priming sentence 405 may be processed to identify instances of concepts contained in the concept model 406. In these embodiments, sentences may be prioritized and selected as discussed above in the case of priming concept instances.

In one or more of the various embodiments, e.g. for subsequent executions of the select sentences to label action 506, sentences may be selected based on an N Sequence Entropy (NSE) calculation, which determines which entities entity model 520 knows the least about, and thereby identifies which sentences to label to best improve accuracy of the model.

Provide text to user for labeling action 510 receives the selected sentences 506 and presents them to a user 412, database 414, or some other source of truth for labeling. While this disclosure commonly refers to sentences being provided to users for labeling, it is similarly contemplated that those sentences may be provided to a database or some other machine-implemented labeling engine for labeling. In one or more of the various embodiments, labeling includes identifying entities within a provided sentence. However, labeling may also include confirming a label proposed by model 520, disconfirming a label proposed by entity model 520, or identifying one or more sentences that include an entity.

Labeled sentences 512 are provided to the create training data action 514. In one or more of the various embodiments, the create training data action 514 formats the labeled sentences, providing formatted sentences 516 to the train model action 518. In one or more of the various embodiments, create training data action 514 formats sentences for training by identifying labeled entities, NLP features such as part of speech tagging, word embeddings, and the like, and combining them with raw sentences for processing by the train model action 518.

In one or more of the various embodiments, train model action 518 performs a machine learning algorithm on the formatted sentences 516, creating or updating model 520/522. In one or more of the various embodiments, once an end user indicates that training is complete, model 522 is provided as an output of the assisted learning process. Additionally or alternatively, the assisted learning process continues by using entity models 520 to select additional sentences to provide a user for labeling.

In one or more of the various embodiments, multiple entity models may be trained for identifying different entities in the text or documents. Each entity model may be trained independently to enable a given model to be tuned for a particular domain. Also, training multiple entity models enables the system to capture different interpretations of what an entity is. For example, using the baseball example, one user may be focused on training entity models that identify persons associated with a team while another may be focused on training entity models to identify baseball players included in the same set of documents or text.

In one or more of the various embodiments, generating entity models that are directed to identifying specific entities improves the overall performance of a modeling platform by providing entity models for recognizing entities that may be used in a query language to gather complicated insights regarding one or more data sets. Accordingly, the computing resources required for gathering such insights may be reduced because rather than training specific models or classifiers for each query, one or more queries may be composed of one or more entity models that are trained to recognize an entity having semantics. This enables smaller scale entity models to be created at less cost and it enables trained entity models to be reused to answer many different questions of queries.

Generalized Operations

FIGS. 6-9 represent the generalized operations for machine assisted learning of entities in accordance with at least one of the various embodiments. In one or more of the various embodiments, processes 600, 700, 800, and 900 described in conjunction with FIGS. 6-9 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, one or more of the various embodiments, the processes described in conjunction with FIGS. 6-9 may be operative in machine-assisted learning of entities such as described in conjunction with FIGS. 4-5.

Figure 6:
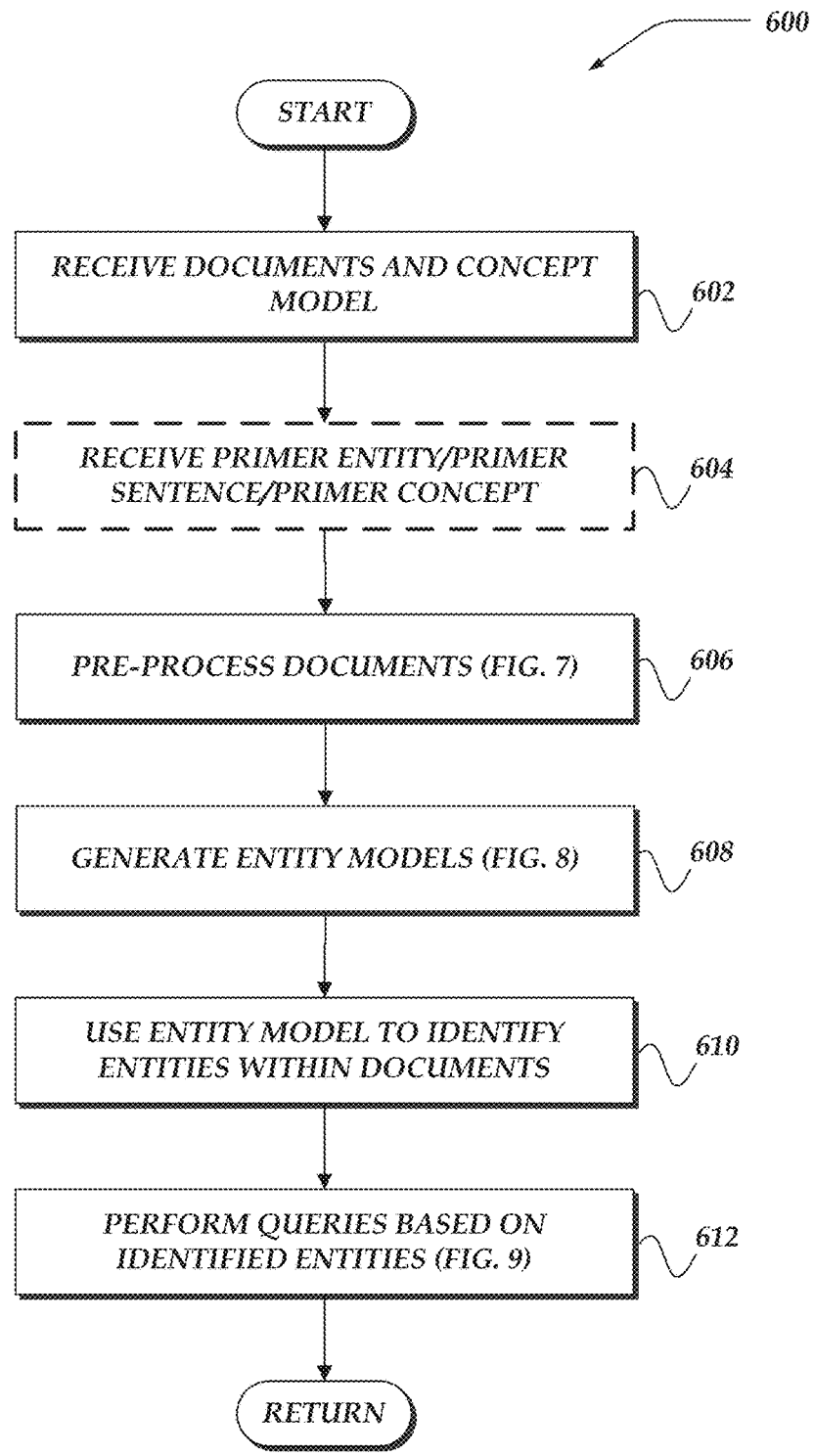
FIG. 6 illustrates an overview flowchart for process for machine assisted learning of entities, in accordance with one or more of the various embodiments.

FIG. 6 illustrates an overview flowchart for process 600 for machine assisted learning of entities, in accordance with one or more of the various embodiments. After a start block, at block 602, in one or more of the various embodiments, a collection of text or documents may be received. In one or more of the various embodiments, the collection of text includes a collection of documents (e.g. a corpus of documents) from which to train an entity model. Entity models may work best when applied to a domain of knowledge they were trained with, and so often the received documents will be part of the same domain of knowledge, e.g. having a shared topic.

Accordingly, in one or more of the various embodiments, different users analyzing different domains may generate different entity models tailored or tuned to a given domain. This enables entity models to capture and leverage domain associated (e.g., problem space) semantics that may more or less relevant depending on the domain perspective of the user. Also, in some embodiments, different entity models for the same user may be generated from the same document corpus depending on the type of problem or information the user is interested in.

For example, in some embodiments, given a corpus of baseball related documents, if a user is attempting to generate entity models to answer queries associated with the financial operations of a professional baseball team, those entity models may be significantly different than entity models generated for answering questions about game performance. At block 602, in one or more of the various embodiments, a concept model is also received. The concept model may encode knowledge provided by experts. For example, an expert may craft an ontology encoded in the concept model. In the baseball domain example used throughout this disclosure, the ontology of <team>-<player>-<position> relates three concepts, where adjacency indicates a relationship. A baseball concept model may be expanded to include concepts such as <cities>, <games>, <all-stars>, <records>, and the like. A concept model may be populated with concept instances (or references to concept instances). For example, the <team> concept may be associated with one or more instances, e.g. "Cubs", "Red Sox", etc.

At block 604, in one or more of the various embodiments, optionally, a primer entity, sentence, concept, or concept instance is received (hereinafter "primers"). In one or more of the various embodiments, these primers may be used to prime an assisted learning process for training an entity model.

At block 606, in one or more of the various embodiments, the received text collection is pre-processed. Text pre-processing is discussed in more detail below in conjunction with FIG. 7. Briefly, however, in one or more of the various embodiments, the received collection of text is processed by dividing the text into sections, such as sentences. Sentences may then be processed to identify associations (e.g., words or phrases that may be entities) to concepts included in the received concept model. Additionally or alternatively, sentences may be processed to identify parts of speech or to generate word embeddings, while other techniques of sentence classification and processing are similarly contemplated. Pre-processed sentences are available to be prioritized and provided to a user for labeling as part of training the entity model.

At block 608, in one or more of the various embodiments, an entity model is generated. Generating the entity model is discussed in more detail below in conjunction with FIG. 8. Briefly, however, entity models refer to a model arranged and trained to locate a particular entity or particular entities in text. The entity model may be trained using machine learning techniques. One such technique is assisted learning, in which a user iteratively labels example sentences, the results of which are used to refine the NER model, which is then used to select more example sentences to be labeled. In one or more of the various embodiments, training ends when a user stops participating in the assisted learning. In another embodiment, training ends when a threshold level of accuracy of the generated entity model is reached.

At block 610, in one or more of the various embodiments, the generated entity model is used to identify one or more entities within one or more text documents. For example, a history book of the Chicago Cubs may be analyzed with one or more entity models trained to identify baseball player names. The entity models may identify famous players that it has already encountered, such as "Ernie Banks", while the entity model may identify other players based on a shared set of features, e.g. part of speech tags, word embeddings, etc. In one or more of the various embodiments, the text documents include the collection of text received at block 602.

At block 612, in one or more of the various embodiments, one or more queries may be performed over data structures including or linked to entities identified within text. Performing the queries is discussed in more detail below in conjunction with FIG. 9. Briefly, however, the list of entities extracted by block 610 may be stored in a table, concept model, or other structured storage mechanism. The entities may be linked to other structured (e.g. SQL table) or unstructured (e.g. text-based document) data, such that queries including the identified entities can be made against the linked structured or unstructured data. For example, if baseball player names have been extracted from a collection of sports pages and linked to a collection of Sports Illustrated® columns, a user could perform a query asking which baseball players were mentioned in Sports Illustrated® articles between 2007 and 2008.

Next, control may be returned to a calling process.

Figure 7:
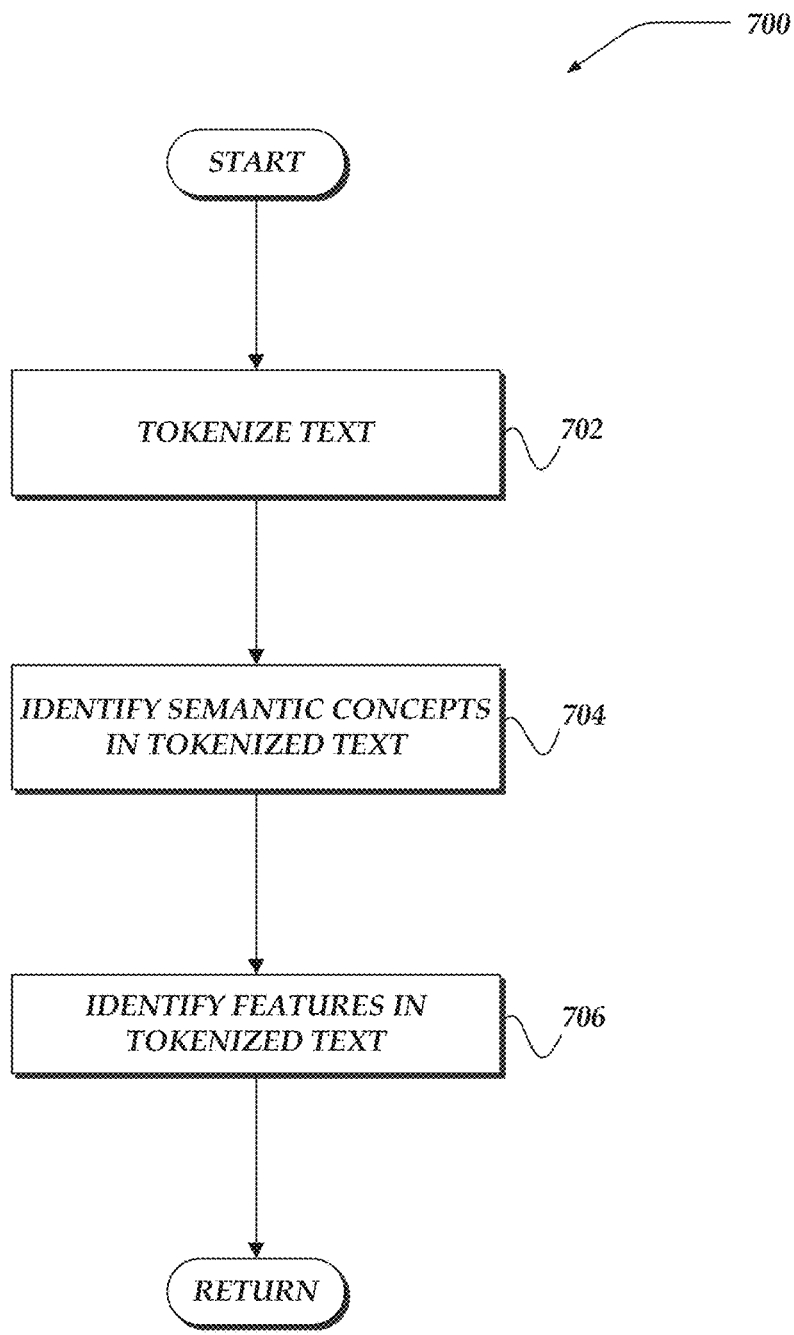
FIG. 7 illustrates a flowchart for pre-processing a collection of text, in accordance with one or more of the various embodiments.

FIG. 7 illustrates a flowchart for process 700 for pre-processing a collection of text, in accordance with one or more of the various embodiments. After a start block, at block 702, in one or more of the various embodiments, the collection of text is tokenized. For example, the collection of text may be divided into sections, e.g. pages, columns, paragraphs, phrases, lines, etc. In one or more of the various embodiments, the sections resulting from the tokenization process may be stored in a collection of raw sections (e.g.

raw sentences) that may be filtered, prioritized, and selected from to provide example sentences to a user for labeling.

At block 704, in one or more of the various embodiments, semantic concepts are identified in the sentences. For example, the tokenized text (e.g. sentence) may be searched for semantic concepts included in concept model 406. In one or more of the various embodiments, the tokenized text is searched for semantic concepts by searching for instances of semantic concepts, e.g. by searching for <player> instances such as "Andre Dawson".

At block 706, in one or more of the various embodiments, features are identified in the sections of text by applying natural language processing operations such as part of speech tagging, word embedding, or the like. In one or more of the various embodiments, the identified features may be used to find similar sentences for labeling by a user.

Next, control may be may be returned to a calling process.

Figure 8:
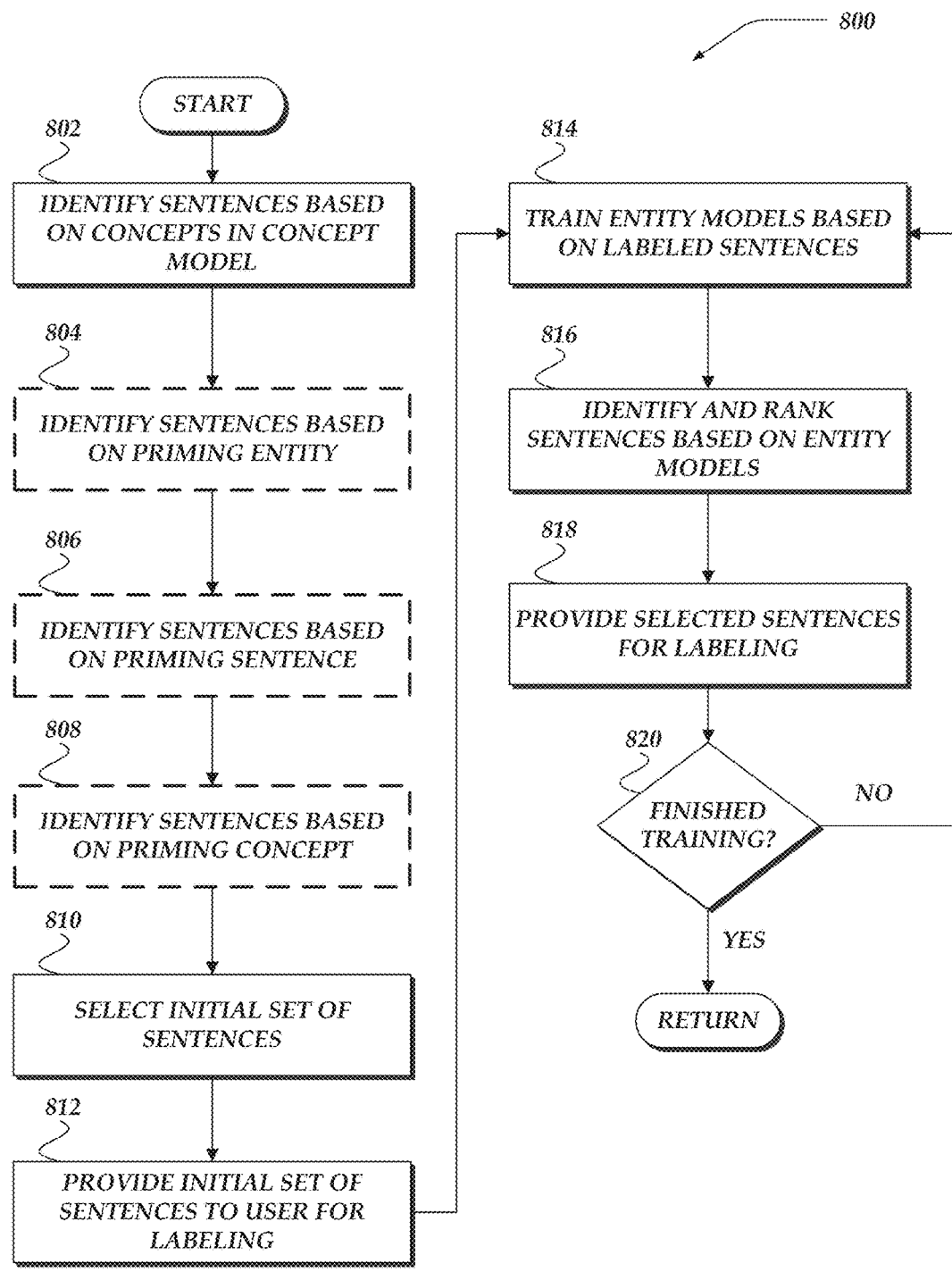
FIG. 8 illustrates a flowchart process for generating a entity model, in accordance with one or more of the various embodiments.

FIG. 8 illustrates a flowchart process 800 for generating an entity model, in accordance with one or more of the various embodiments. After a start block, at block 802, in one or more of the various embodiments, sentences are identified from pre-processed sentences 504 based on concepts in the concept model 406. Identifying sentences in this way does not use an explicit primer supplied by a user, as do blocks 804-808, but relies on the information encoded in the concept model 406 itself.

As discussed above, a concept model may refer to a graph where nodes represent concepts and edges represent relationships between concepts, while each concept may be associated with one or more instances of that concept. For example, a concept model in the domain of baseball players may include the concepts <team>-<player>-<position>, where <team> is related to <player> and <player> is related to <position>. Each concept may be associated with one or more instances, e.g. <team> may be associated with "Cubs", "Mariners", etc., <player> may be associated with "Andre Dawson", "Don Mattingly", etc., <position> may be associated with "center field", "catcher", etc.

In one or more of the various embodiments, sentences may be identified by matching concepts identified in a sentence with concepts identified in the concept model 406. For example, if an instance "Wade Boggs" of a concept <player> appears in the sentence "Wade Boggs hit a single to left-center", and if "Wade Boggs" is an instance of <player> in the concept model, the sentence may be selected.

In one or more of the various embodiments, identified sentences may be prioritized based on a number of concept instances identified in a sentence, a number of different concept instances identified in a sentence, a proximity of the different concept instances to each other within the concept model, etc. For example, a sentence that includes "Wade Boggs" five times may be prioritized over a sentence that includes "Don Mattingly" three times. However, in one or more of the various embodiments, a sentence that includes three instances from different concepts, e.g. "Don Mattingly", "Yankee Stadium", and "New York City" may be prioritized over the sentence that mentions "Wade Boggs" five times. Furthermore, a sentence with two instances from different concepts that are proximate, e.g. "Andre Dawson" and "Right Field", where <player> and <position> are adjacent, may be prioritized over the sentence with three instances that are associated with concepts that are "less" related to each other.

Blocks 804-808 discuss user supplied priming data used to identify and prioritize sentences. In one or more of the various embodiments, optionally, a user may prime the assisted learning process by providing a priming entity, a priming sentence that contains an entity, or by identifying a priming concept in a concept model (or an instance of a priming concept in the concept model), or the like, or a combination thereof. This priming may augment or replace the process described above in conjunction with block 802 for identifying a first set of sentences to be labeled by the user.

At block 804, in one or more of the various embodiments, optionally, sentences are identified from pre-processed sentences 504 based on a priming entity, such as, a player name, such as, "Don Mattingly" or a part number, such as, "4523.300". These priming entities may be provided by a user directly, retrieved from a configuration file, or the like. In one or more of the various embodiments, sentences 504 may be searched for sentences that contain one or more of the priming entities.

Sentences that contain one or more of the priming entities may be prioritized based on a number of entities in the sentence, whether different priming entities match in the same sentence, and the like, or a combination thereof.

Additionally or alternatively, these sentences may be analyzed to see if they contain concepts also included in the concept model 406. Sentences that include one or more concepts found in concept model 406 may be prioritized over those that don't. Furthermore, in embodiments where a priming concept is also provided (see discussion of block 808 below), sentences that include concepts proximate to the priming concept (e.g. that are adjacent to the priming concept) may be further prioritized.

At block 806, in one or more of the various embodiments, optionally, sentences are identified from pre-processed sentences 504 based on a priming sentence. For example, a user may supply the sentence "In the bottom of the $7^{th}$, Don Mattingly caught a line drive to end the inning" or "Andre Dawson struck out three times". As discussed above, these priming sentences may be processed with part of speech tagging, word embeddings, and other natural language processing techniques. The resulting features may then be used to identify sentences from pre-processed sentences 504 having similar features.

Sentences identified based on a priming sentence may also be prioritized based on concept instances (e.g. "shortstop") being shared by the priming sentence and the identified sentence. In embodiments where a user has also supplied a priming concept, sentences may be further prioritized when shared concepts are proximate to (e.g. adjacent to) the priming concept in the concept model. For example, an identified sentence may be further prioritized if both sentences include the concept instance "shortstop", and may be further prioritized if a priming concept of <player> was provided, given that <player> is adjacent to <position> in the concept model.

At block 808, in one or more of the various embodiments, optionally, when the user has provided a priming concept, sentences that contain an instance of the priming concept may be identified. For example, if a user selects the <player> concept, which is associated with two instances, "Andre Dawson" and "Don Mattingly", pre-processed sentences 504 may be searched for "Andre Dawson" and "Don Mattingly". Similarly, if the user has provided a priming concept instance, such as "Andre Dawson", only sentences containing "Andre Dawson" will be identified.

Sentences identified in this way may be prioritized based on a number of instances of a primer concept found, a number of different instances of a primer concept found, and the like. When multiple primer concepts are supplied, sentences with instances of different primer concepts may be prioritized.

Furthermore, in one or more of the various embodiments, sentences containing secondary concepts, e.g. instances of concepts that are proximate to (e.g. adjacent to) the priming concept, may be prioritized. For example, if a priming concept <player> may be chosen, and so sentences with instances of <player> concepts may be prioritized. Sentences that have instances of concepts adjacent to, or otherwise proximate to, the <player> concept, may also be prioritized. For example, a sentence that includes a <position> instance, such as "catcher", may be prioritized as baseball players are often referenced in conjunction with their position on the field.

At block 810, in one or more of the various embodiments, an initial set of sentences is selected. In one or more of the various embodiments, the initial set of sentences identified in blocks 802-808 are prioritized based on factors described above. In one or more of the various embodiments, the sentences with the highest priority are selected. In one or more of the various embodiments, the number of sentences selected is between 2 and 10, enough to train a model to effectively select the next round of sentences to label, but not so many that end users are burdened. The number of sentences selected may be determined by a user input, a configuration file, or a default value.

Because the set of initial sentences are not chosen at random, the quality of the initial sentences is higher. Therefore, subsequent sentences, which are chosen based on the NER model generated based on answers to the set of initial sentences, are also likely to be of higher quality. In this way, fewer labeling operations are required on subsequent operations to perform to equivalently train the model. For example, if prior art solutions supply 50 sentences at random, and 2 of them have a baseball player's name, there is less information available to train the model then if 5 sentences were provided and 4 of them had a baseball player's name.

At block 812, in one or more of the various embodiments, the initial set of sentences is provided to a user or other source of truth (e.g. database 414) for labeling. Sentences may be labeled by identifying one or more entities within the sentence (e.g. pointing to a word or phrase as an entity, creating a description of a word or phrase, etc.), confirming or disconfirming one or more suggested labels of an entity within the sentence, selecting sentences that include an entity, or the like.

At block 814, in one or more of the various embodiments, an entity recognition (NER) model is trained based on received labeled sentences. In one or more of the various embodiments, the NER model may be trained for the first time based on labeling of the initial set of sentences. However, after the initial iteration, sentences will be identified for labeling based on the NER model, in which case the NER model is updated or otherwise refined based on labeled sentences.

Once a sentence has been labeled, the model may be trained based on the additional entities, confirmed entities, disconfirmed entities, semantic features of the labeled sentence, and the like. For example, these variables may be provided to a Conditional Random Field (CRF) machine learning model, although other machine learning models such as hidden Markov models are similarly contemplated.

At block 816, in one or more of the various embodiments, additional sentences may be identified and prioritized to be provided to the user for labeling. In one or more of the various embodiments, sentences are selected based in part on an N Sequence Entropy (NSE) metric. An NSE metric may be generated in part by applying NER model 416 to one or more of sentences 504. The NSE metric indicates how sure (or how unsure) NER model 416 is about a labeling judgment. In one or more of the various embodiments, sentences with high NSE metrics, i.e. that have a greater amount of entropy, are prioritized over sentences with a low NSE metric. This is based on the intuition that learning more about what one already knows a lot about is less useful than learning more about something about which one is confused.

Additionally or alternatively, sentences may be prioritized based on parts of speech, word embeddings, or other NLP semantics. For example, sentences that share semantics with high confidence guesses may have their NSE metric artificially decreased, reflecting the intuition that we should be more confident about sentences that are similar to sentences we know more about.

In one or more of the various embodiments, for sentences that don't share concepts or semantic similarity with sentences having high confidence (i.e. low entropy), something is likely being missed, and so these sentences are prioritized.

At block 818, in one or more of the various embodiments, a selection of the prioritized sentences are labeled and provided to the user to confirm or disconfirm the label. The user may be asked, "how correct is this label"? The user may confirm that some labels are correct, e.g. that in the domain of baseball players, "Wade Boggs" is a baseball player, as is "Babe Ruth" and "Bo Jackson", but "Tom Brady" is not. Additionally or alternatively, the user may label other entities included in the sentence that were not labeled by the assisted learning process. The results of this confirming/disconfirming/labeling may be provided to further train the NER model, as discussed above.

At decision block 820, in one or more of the various embodiments, a determination is made whether training is finished (yes, proceed to the return block), or whether training has not finished (no, proceed to block 814). Training may stop once a user as stopped labeling or when entity confidence (e.g. the inverse of entropy) crosses a defined threshold. In one or more of the various embodiments, the entity confidence threshold is user defined, loaded from a configuration file, or set to a default value.

By iteratively labeling entities in sentences, the NER model learns to identify entities that it hasn't seen before. In one or more of the various embodiments, if "Andre Dawson" is labeled as a player in the sentence "Andre Dawson struck out to end the inning", the entity label, in conjunction with part of speech tagging, may allow the NER model to identify "Ryne Sandberg" as a player from the sentence "Ryne Sandberg struck out to end the $8^{th}$ inning."

Figure 9:
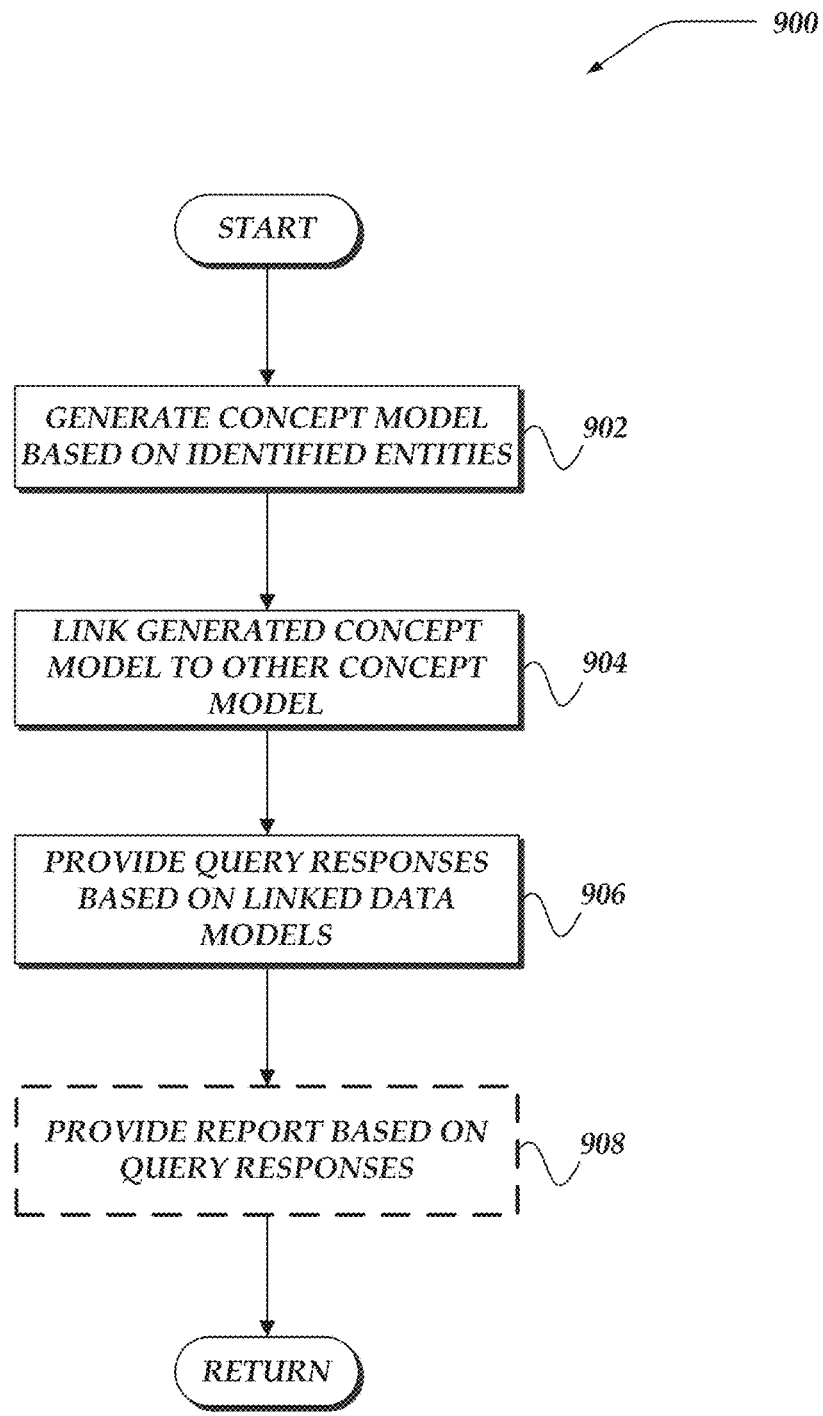
FIG. 9 illustrates a flowchart process for querying data related to identified entities, in accordance with one or more of the various embodiments.

FIG. 9 illustrates a flowchart process 900 for querying data related to identified entities, in accordance with one or more of the various embodiments. After a start block, at block 902, the entity model is applied to one or more text-based documents to extract a list of entities. For example, a sports section of a newspaper may be processed to identify a list of baseball players. In one or more of the various embodiments, this list of entities may be used to generate or populate a concept model, table, or other queryable data structure. For example, identified entities may be inserted into a concept model as concept instances, or inserted as rows of a database table. In one or more of the various embodiments, the list of entities may be used to populate the concept model 406 used to train the NER model.

At block 904, in one or more of the various embodiments, the generated concept model is linked to another concept model. For example, a concept model populated with entities extracted from celebrity tabloids reporting on the personal lives of baseball players may be linked to a concept model populated with baseball players extracted from sports pages.

However, in another embodiment, the list of entities is linked to unstructured data, such as unprocessed documents or other sources of raw text. In one of these embodiments, the list of entities may be linked to locations in a document where the entity occurs. These links may be used to create a pedigree, i.e. to verify the accuracy of the entity model by checking an entity against the document it was identified in.

At block 906, in one or more of the various embodiments, a query based on the linked data models is received. The query may include the equivalent of a join function, enabling queries of concepts and concept instances in the generated concept model while also querying against concepts and concept instances in the linked concept model. For example, a query may return the batting averages of all baseball players mentioned in a tabloid publication.

At block 908, in one or more of the various embodiments, optionally, a display containing one or more of the documents containing one or more of the recognized entities is provided. This is an example of linking extracted entities to un-structured data. However, any other type of unstructured data is similarly contemplated, including lists of other entities.

Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. These program instructions may be stored on some type of machine readable storage media, such as processor readable non-transitive storage media, or the like. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for managing data using one or more processors, included in one or more network computers, to execute instructions for implementing a modeling platform server that performs actions, comprising:
   instantiating a data engine that performs actions including:
      providing a data model that includes one or more concepts and one or more relations between the concepts, wherein each concept is a node in the data model and each relation is an edge in the data model; and
      providing one or more documents that include one or more entities, wherein the one or more entities are associated with the one or more concepts; and
   instantiating a training engine that performs actions, including:
      traversing the data model to determine one or more concept characteristics associated with the one or more concepts that are associated with the one or more entities;
      evaluating the one or more documents to identify one or more document characteristics associated with the one or more entities; and
      training one or more entity models based on the one or more concept characteristics and the one or more document characteristics, wherein each entity model is associated with a confidence value; and
   instantiating a query engine to perform actions including:
      resolving results for one or more queries based on the one or more documents and the one or more entity models, wherein the results reference the one or more documents that are associated with the one or more entities; and
      determining one or more entity models that are associated with a confidence value that is below a threshold value for the results; and
      providing the one or more determined entity models to the training engine for re-training.

2. The method of claim 1, wherein training the one or more entity models, further comprises, determining the one or more concept characteristics, or the one or more document characteristics based on input from one or more users.

3. The method of claim 1, wherein determining the one or more concept characteristics, further comprises, determining one or more of additional related entities, confirmed entities, disconfirmed entities, semantic features, or characteristics associated with other related concepts.

4. The method of claim 1, wherein evaluating the one or more documents, further comprises, dividing the one or more documents into one or more of words, parts-of-speech, sentences, paragraphs, pages, sections, chapters, versions, or volumes.

5. The method of claim 1, wherein training the one or more entity models, further comprises:
   traversing one or more other data models that are related to the one or more documents;
   linking the one or more entities to the one or more other data models; and
   linking the one or more entities to the data model.

6. The method of claim 1, wherein providing the results based on the one or more documents and the one or more entity models, further comprises:

determining the one or more entities that are associated with the results; and associating the one or more determined entities with the one or more documents, wherein the one or more associated documents are one or more source documents that are associated with the one or more determined entities.

7. The method of claim 1, wherein training the one or more entity models, further comprises, modifying the data model based on the training of the one or more entity models, wherein the modifications include one or more of adding concepts, removing concepts, adding relations, or removing relations.

8. A system for managing data over a network, comprising:

a network computer, comprising:
- a transceiver that communicates over the network;
- a memory that stores at least instructions; and
- one or more processors that execute instructions that perform actions, including:
  - instantiating a data engine that performs actions including:
    - providing a data model that includes one or more concepts and one or more relations between the concepts, wherein each concept is a node in the data model and each relation is an edge in the data model; and
    - providing one or more documents that include one or more entities, wherein the one or more entities are associated with the one or more concepts; and
  - instantiating a training engine that performs actions, including:
    - traversing the data model to determine one or more concept characteristics associated with the one or more concepts that are associated with the one or more entities;
    - evaluating the one or more documents to identify one or more document characteristics associated with the one or more entities; and
    - training one or more entity models based on the one or more concept characteristics and the one or more document characteristics, wherein each entity model is associated with a confidence value; and
  - instantiating a query engine to perform actions including:
    - resolving results for one or more queries based on the one or more documents and the one or more entity models, wherein the results reference the one or more documents that are associated with the one or more entities; and
    - determining one or more entity models that are associated with a confidence value that is below a threshold value for the results; and
    - providing the one or more determined entity models to the training engine for re-training; and a client computer, comprising:
- another transceiver that communicates over the network;
- another memory that stores at least instructions; and
- one or more processors that execute instructions that perform actions, including:
  - displaying the result on a hardware display.

9. The system of claim 8, wherein training the one or more entity models, further comprises, determining the one or more concept characteristics, or the one or more document characteristics based on input from one or more users.

10. The system of claim 8, wherein determining the one or more concept characteristics, further comprises, determining one or more of additional related entities, confirmed entities, disconfirmed entities, semantic features, or characteristics associated with other related concepts.

11. The system of claim 8, wherein evaluating the one or more documents, further comprises, dividing the one or more documents into one or more of words, parts-of-speech, sentences, paragraphs, pages, sections, chapters, versions, or volumes.

12. The system of claim 8, wherein training the one or more entity models, further comprises:
- traversing one or more other data models that are related to the one or more documents;
- linking the one or more entities to the one or more other data models; and
- linking the one or more entities to the data model.

13. The system of claim 8, wherein providing the results based on the one or more documents and the one or more entity models, further comprises:
- determining the one or more entities that are associated with the results; and
- associating the one or more determined entities with the one or more documents, wherein the one or more associated documents are one or more source documents that are associated with the one or more determined entities.

14. The system of claim 8, wherein training the one or more entity models, further comprises, modifying the data model based on the training of the one or more entity models, wherein the modifications include one or more of adding concepts, removing concepts, adding relations, or removing relations.

15. A processor readable non-transitory storage media that includes instructions for managing data, wherein execution of the instructions by one or more hardware processors performs actions, comprising:

instantiating a data engine that performs actions including:
- providing a data model that includes one or more concepts and one or more relations between the concepts, wherein each concept is a node in the data model and each relation is an edge in the data model; and
- providing one or more documents that include one or more entities, wherein the one or more entities are associated with the one or more concepts; and instantiating a training engine that performs actions, including:
- traversing the data model to determine one or more concept characteristics associated with the one or more concepts that are associated with the one or more entities;
- evaluating the one or more documents to identify one or more document characteristics associated with the one or more entities; and
- training one or more entity models based on the one or more concept characteristics and the one or more document characteristics, wherein each entity model is associated with a confidence value; and instantiating a query engine to perform actions including:
- resolving results for one or more queries based on the one or more documents and the one or more entity models, wherein the results reference the one or more documents that are associated with the one or more entities; and determining one or more entity models that are associated with a confidence value that is below a threshold value for the results; and providing the one or more determined entity models to the training engine for re-training.

16. The media of claim 15, wherein training the one or more entity models, further comprises, determining the one or more concept characteristics, or the one or more document characteristics based on input from one or more users.

17. The media of claim 15, wherein determining the one or more concept characteristics, further comprises, determining one or more of additional related entities, confirmed entities, disconfirmed entities, semantic features, or characteristics associated with other related concepts.

18. The media of claim 15, wherein evaluating the one or more documents, further comprises, dividing the one or more documents into one or more of words, parts-of-speech, sentences, paragraphs, pages, sections, chapters, versions, or volumes.

19. The media of claim 15, wherein training the one or more entity models, further comprises:

traversing one or more other data models that are related to the one or more documents;

linking the one or more entities to the one or more other data models; and linking the one or more entities to the data model.

20. The media of claim 15, wherein providing the results based on the one or more documents and the one or more entity models, further comprises:

determining the one or more entities that are associated with the results; and associating the one or more determined entities with the one or more documents, wherein the one or more associated documents are one or more source documents that are associated with the one or more determined entities.

21. The media of claim 15, wherein training the one or more entity models, further comprises, modifying the data model based on the training of the one or more entity models, wherein the modifications include one or more of adding concepts, removing concepts, adding relations, or removing relations.

22. A network computer for managing data, comprising:
a transceiver that communicates over the network;
a memory that stores at least instructions; and
one or more processors that execute instructions that perform actions, including:
instantiating a data engine that performs actions including:
providing a data model that includes one or more concepts and one or more relations between the concepts, wherein each concept is a node in the data model and each relation is an edge in the data model; and
providing one or more documents that include one or more entities, wherein the one or more entities are associated with the one or more concepts; and
instantiating a training engine that performs actions, including:
traversing the data model to determine one or more concept characteristics associated with the one or more concepts that are associated with the one or more entities;
evaluating the one or more documents to identify one or more document characteristics associated with the one or more entities; and
training one or more entity models based on the one or more concept characteristics and the one or more document characteristics, wherein each entity model is associated with a confidence value; and instantiating a query engine to perform actions including:
resolving results for one or more queries based on the one or more documents and the one or more entity models, wherein the results reference the one or more documents that are associated with the one or more entities; and
determining one or more entity models that are associated with a confidence value that is below a threshold value for the results; and
providing the one or more determined entity models to the training engine for re-training.

23. The network computer of claim 22, wherein training the one or more entity models, further comprises, determining the one or more concept characteristics, or the one or more document characteristics based on input from one or more users.

24. The network computer of claim 22, wherein determining the one or more concept characteristics, further comprises, determining one or more of additional related entities, confirmed entities, disconfirmed entities, semantic features, or characteristics associated with other related concepts.

25. The network computer of claim 22, wherein evaluating the one or more documents, further comprises, dividing the one or more documents into one or more of words, parts-of-speech, sentences, paragraphs, pages, sections, chapters, versions, or volumes.

26. The network computer of claim 22, wherein training the one or more entity models, further comprises:
traversing one or more other data models that are related to the one or more documents;
linking the one or more entities to the one or more other data models; and
linking the one or more entities to the data model.

27. The network computer of claim 22, wherein providing the results based on the one or more documents and the one or more entity models, further comprises:
determining the one or more entities that are associated with the results; and
associating the one or more determined entities with the one or more documents, wherein the one or more associated documents are one or more source documents that are associated with the one or more determined entities.

28. The network computer of claim 22, wherein training the one or more entity models, further comprises, modifying the data model based on the training of the one or more entity models, wherein the modifications include one or more of adding concepts, removing concepts, adding relations, or removing relations.

* * * * *